(12) United States Patent
Jeong et al.

(10) Patent No.: US 11,796,049 B2
(45) Date of Patent: Oct. 24, 2023

(54) IN-WHEEL DRIVING APPARATUS

(71) Applicant: HYUNDAI MOBIS CO., LTD., Seoul (KR)

(72) Inventors: Ui Il Jeong, Yongin-si (KR); Yeong Woo Seo, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 81 days.

(21) Appl. No.: 17/382,852

(22) Filed: Jul. 22, 2021

(65) Prior Publication Data
US 2022/0024300 A1    Jan. 27, 2022

(30) Foreign Application Priority Data

Jul. 23, 2020    (KR) .................. 10-2020-0091931

(51) Int. Cl.
| | |
|---|---|
| *F16H 57/04* | (2010.01) |
| *F16H 1/06* | (2006.01) |
| *B60K 17/04* | (2006.01) |
| *F16H 57/02* | (2012.01) |

(52) U.S. Cl.
CPC ....... *F16H 57/0423* (2013.01); *B60K 17/043* (2013.01); *F16H 1/06* (2013.01); *F16H 57/0424* (2013.01); *F16H 57/0457* (2013.01); *B60Y 2306/03* (2013.01); *F16H 2057/02043* (2013.01)

(58) Field of Classification Search
CPC ........ F16H 1/06; F16H 57/02; F16H 57/0409; F16H 57/0421; F16H 57/0423; F16H 57/0457; F16H 57/0476; F16H 2057/02043; F16H 57/0424; B60Y 2306/03; B60K 17/043
See application file for complete search history.

(56) References Cited

U.S. PATENT DOCUMENTS

| | | | | |
|---|---|---|---|---|
| 3,529,698 | A * | 9/1970 | Nelson | F16H 57/0447 184/6.12 |
| 4,879,921 | A * | 11/1989 | Asada | F16H 57/027 184/6.12 |
| 8,261,883 | B2 * | 9/2012 | Ariga | F16H 57/0423 474/1 |
| 8,366,575 | B2 * | 2/2013 | Ariga | F16H 57/0471 123/196 R |
| 9,772,027 | B2 * | 9/2017 | Preston | F16H 57/0409 |

(Continued)

FOREIGN PATENT DOCUMENTS

| | | | | |
|---|---|---|---|---|
| CH | | 688524 A5 * | 10/1997 | ......... F16H 57/0493 |
| CN | | 215445014 U * | 1/2022 | ........... B60K 17/043 |

(Continued)

*Primary Examiner* — Adam D Rogers
(74) *Attorney, Agent, or Firm* — MORGAN, LEWIS & BOCKIUS LLP

(57) ABSTRACT

The present disclosure relates to an in-wheel driving apparatus, and an in-wheel driving apparatus includes a case having an interior space, a first gear disposed in the interior space to be rotatable about a first rotary shaft, a second gear engaged with the first gear and disposed in the interior space to be rotatable about a second rotary shaft, and a first partition wall including a first area provided along a circumference of the first gear and a second area extending from one end of the first area in a direction that is away from the first rotary shaft, and disposed in the interior space.

12 Claims, 7 Drawing Sheets

(56) References Cited

U.S. PATENT DOCUMENTS

| | | | |
|---|---|---|---|
| 10,260,616 B2 * | 4/2019 | Lee | F16H 57/0423 |
| 10,408,335 B2 * | 9/2019 | Suenaga | F16H 57/0457 |
| 10,458,533 B2 * | 10/2019 | Ono | F16H 57/0476 |
| 10,767,752 B2 * | 9/2020 | Kawai | F16H 57/029 |
| 10,781,909 B2 * | 9/2020 | Graves | H02K 7/116 |
| 11,149,838 B2 * | 10/2021 | Hagino | F01M 9/06 |
| 11,174,938 B2 * | 11/2021 | Ohkawa | F16H 57/0424 |
| 2013/0233107 A1 * | 9/2013 | Von Wilmowsky | F16H 57/02 74/421 R |
| 2014/0155214 A1 * | 6/2014 | Kimura | F16H 57/045 475/160 |
| 2022/0025967 A1 * | 1/2022 | Kim | H02K 5/203 |

FOREIGN PATENT DOCUMENTS

| | | | | |
|---|---|---|---|---|
| DE | 102019130616 A1 | * | 1/2020 | |
| DE | 202019103779 U1 | * | 11/2020 | |
| GB | 292540 A | * | 9/1928 | |
| GB | 514248 A | * | 11/1939 | |
| JP | H08219259 A | * | 8/1996 | |
| JP | 2005024072 A | * | 1/2005 | F16H 57/0421 |
| JP | 3956770 B2 | * | 8/2007 | |
| WO | WO-2011121861 A1 | * | 10/2011 | F16H 57/037 |
| WO | WO-2019054381 A1 | * | 3/2019 | B60K 7/00 |

* cited by examiner

-- Related Art --

IN-WHEEL DRIVING APPARATUS

CROSS-REFERENCE TO RELATED APPLICATION

This application claims the benefit of priority to Korean Patent Application No. 10-2020-0091931, filed in the Korean Intellectual Property Office on Jul. 23, 2020, the entire contents of which are incorporated herein by reference.

TECHNICAL FIELD

The present disclosure relates to an in-wheel driving apparatus.

BACKGROUND

In general, an in-wheel driving apparatus relates to a technology used in a vehicle, such as an electric vehicle, which employs electricity as a power source, and unlike a scheme of rotating wheels via transmission of power through an engine-transmission-driving shaft mechanism in a gasoline or diesel vehicle, directly drives wheels with motors disposed in the interiors of wheels.

The in-wheel apparatus requires a structure for securing an amount of oil that may cool and lubricate a motor stator, a reducer, and the like due to a limited configuration of a package.

FIG. 1 is a view illustrating an in-wheel apparatus 1 according to the related art. In the in-wheel apparatus 1 according to the related art, oil may generate a severe drag in a high RPM area of about 5,000 to 6,000 RPM when the oil contacts a rotor, deteriorating efficiency, and in severe cases, a rotor may be damaged. Furthermore, when the temperature of the oil increases due to the friction of the rotor and the oil, it becomes difficult to cool the stator, and the magnetic force of a permanent magnet decreases and the magnet may be burned out. Accordingly, according to the in-wheel apparatus 1 according to the related art, because the level of oil has to be restricted to a border point of a stator and a rotor, the amount of the oil is not sufficient.

SUMMARY

The present disclosure has been made to solve the above-mentioned problems occurring in the prior art while advantages achieved by the prior art are maintained intact.

An aspect of the present disclosure provides an in-wheel driving apparatus that may secure a sufficient amount of oil for cooling and lubricating a motor and a reducer.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an in-wheel driving apparatus includes a case having an interior space, a first gear disposed in the interior space and rotatable about a first rotary shaft, a second gear engaged with the first gear, disposed in the interior space, and rotatable about a second rotary shaft, and a first partition wall including a first area extending along a circumference of the first gear and a second area extending from one end of the first area in a direction away from the first rotary shaft, and disposed in the interior space.

In another embodiment, the interior space may include a first inlet space surrounded by a first surface of the first partition wall, which is opposite to a second surface of the first partition wall facing the first gear, and the case, and including a space, into which oil churned due to rotation of the first gear and the second gear is introduced.

In another embodiment, the interior space may further include a first spacing space by which the second area and the case are spaced apart from each other, and a storage space located under the second rotary shaft, and the oil introduced into the first inlet space may be discharged to the storage space via the first spacing space.

In another embodiment, the first rotary shaft may be disposed on an upper side of the second rotary shaft.

In another embodiment, one end of the first area may be located on a lower side of an enmeshment area that is an area, in which the first gear and the second gear are engaged with each other, and an opposite end of the first area may be located on an upper side of the enmeshment area.

In another embodiment, the opposite end of the first area, which is located on an opposite side to the one end of the first area, may be located on a position overlapping a leftward/rightward width of the first gear.

In another embodiment, the in-wheel driving apparatus may further include a second partition wall including a third area extending along a circumference of the second gear and a fourth area extending from one end of the third area in a direction away from the second rotary shaft, and disposed in the interior space.

In another embodiment, the interior space may include a second inlet space surrounded by a first surface of the second partition wall, which is opposite to a second surface of the second partition wall facing the second gear, and the case, and including a space, into which oil churned due to rotation of the first gear and the second gear is introduced.

In another embodiment, the interior space may further include a second spacing space by which the fourth area and the case are spaced apart from each other, and a storage space located under the second rotary shaft, and the oil introduced into the second inlet space may be discharged to the storage space via the second spacing space.

In another embodiment, an uppermost end of the first area of the first partition wall may be disposed on an upper side of an uppermost end of the third area of the second partition wall.

In another embodiment, the one end of the third area may be located on a position such that the second gear is disposed between the one end of the third area and an enmeshment area, where the enmeshment area is an area in which the first gear and the second gear are engaged with each other, and an opposite end of the third area may be located on an upper side of the enmeshment area.

In another embodiment, the opposite end of the third area, which is located on an opposite side to the one end of the third area, may be located on a position overlapping a leftward/rightward width of the second gear.

In another embodiment, the second area may be located on a lower side of the fourth area.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
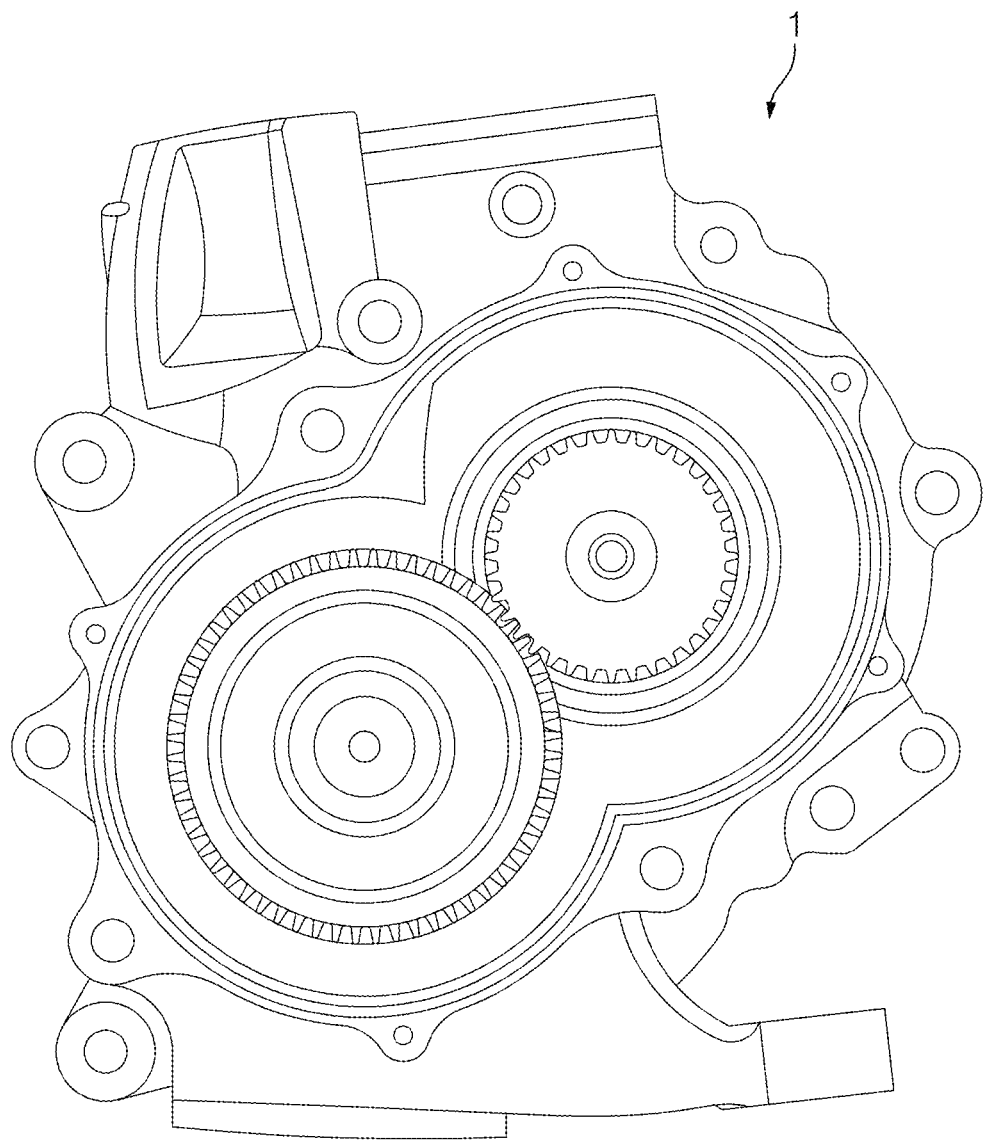
FIG. 1 is a cross-sectional view illustrating an in-wheel apparatus according to the related art.

Hereinafter, some embodiments of the present disclosure will be described in detail with reference to the exemplary drawings. In providing reference numerals to the constituent elements of the drawings, the same elements may have the same reference numerals even if they are displayed on different drawings. Further, in the following description of the present disclosure, a detailed description of known functions and configurations incorporated herein will be omitted when it may make the subject matter of the present disclosure rather unclear.

Figure 2:
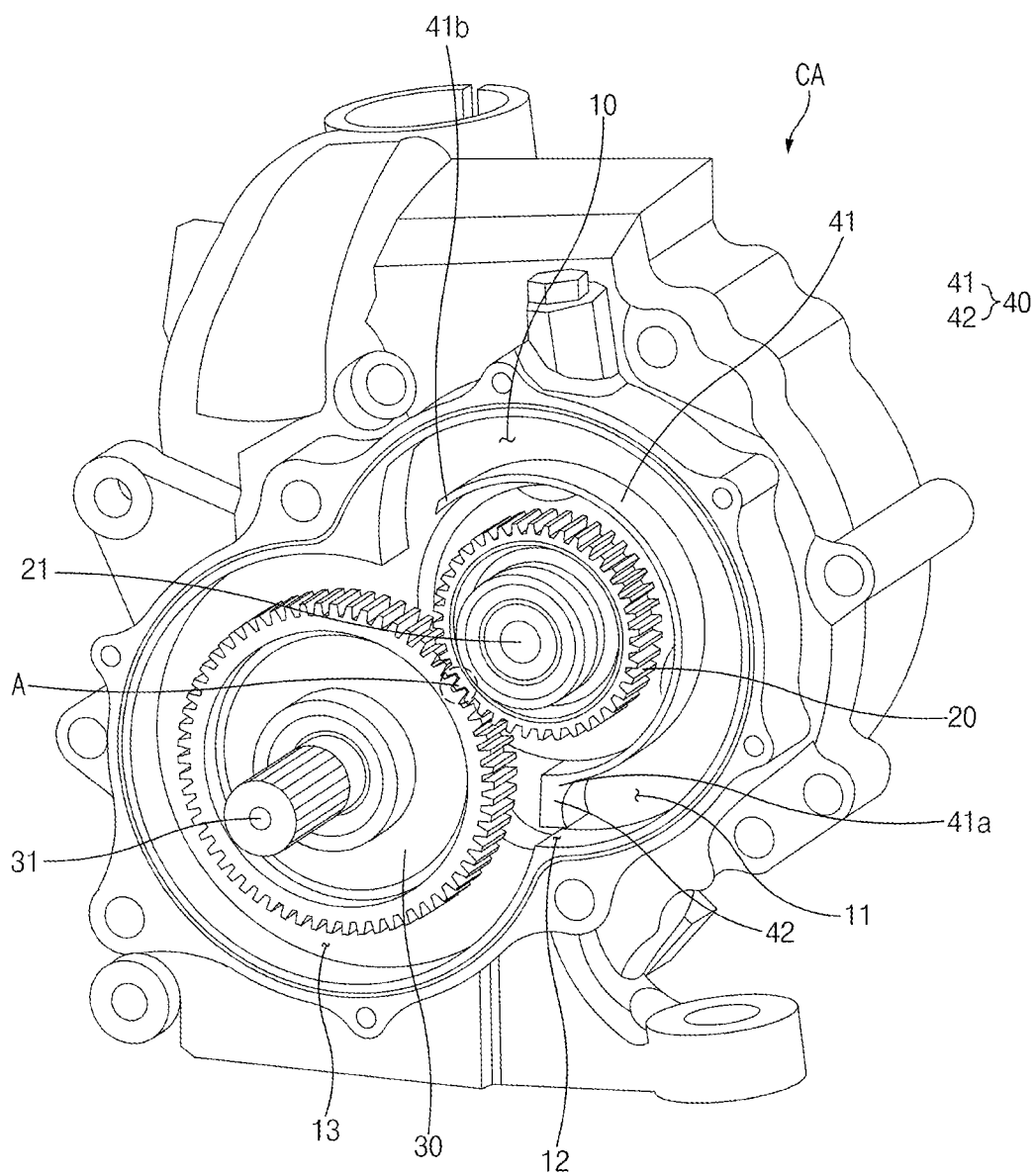
FIG. 2 is a perspective view illustrating an in-wheel driving apparatus according to an embodiment of the present disclosure.

FIG. 2 is a perspective view illustrating an in-wheel driving apparatus according to an embodiment of the present disclosure.

An in-wheel driving apparatus according to an embodiment of the present disclosure relates to an in-wheel driving apparatus that may secure a sufficient amount of oil for cooling and lubricating a motor and a reducer. An in-wheel driving apparatus according to an embodiment of the present disclosure may include a case CA, a first gear 20, a second gear 30, and a first partition wall 40. An interior space 10 may be formed in the case CA. Meanwhile, the first gear 20 may be disposed in the interior space 10 to be rotatable about a first rotary shaft 21. The first gear 20 may be connected to a planetary gear reducer (not illustrated).

Furthermore, the second gear 30 may be configured to be engaged with the first gear 20. Furthermore, the second gear 30 may be disposed in the interior space 10 to be rotatable about a second rotary shaft 31. The second rotary shaft 31 may be parallel to the first rotary shaft 21. Furthermore, the first rotary shaft 21 may be disposed on an upper side of the second rotary shaft 31. Accordingly, the first gear 20 also may be disposed on an upper side of the second gear 30.

The second gear 30 may receive a rotational force from a motor. That is, when the second gear 30 receives the rotational force from the motor and rotates, the first gear 20 that receives the rotational force of the second gear 30 also rotates, and accordingly, an external wheel may rotate. As an example, a diameter of the first gear 20 may be formed to be smaller than a diameter of the second gear 30 such that a rotational angular speed of the first gear 20 is higher than a rotational angular speed of the second gear 30.

Figure 3:
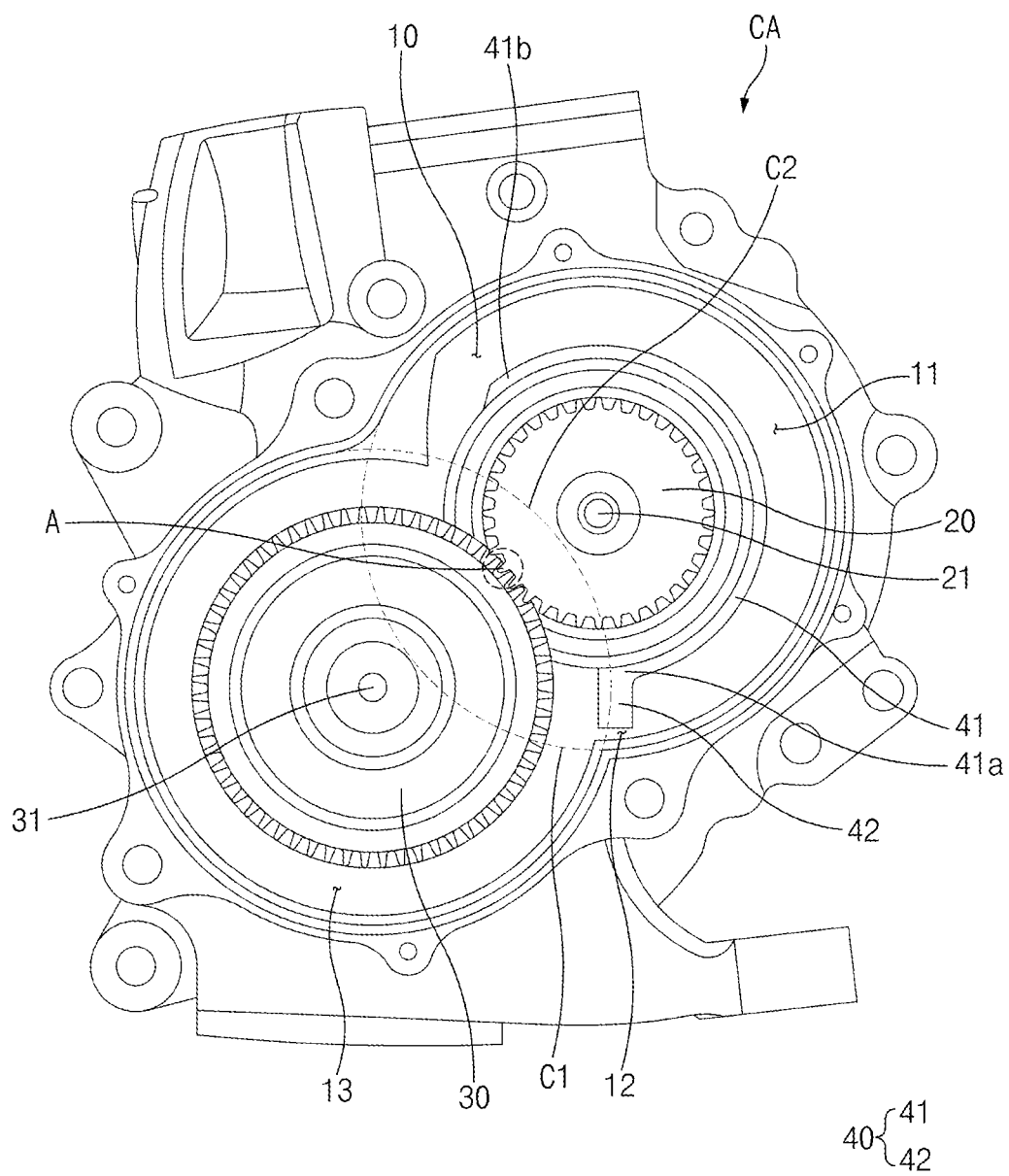
FIG. 3 is a cross-sectional view illustrating an in-wheel driving apparatus according to an embodiment of the present disclosure.

FIG. 3 is a cross-sectional view illustrating an in-wheel driving apparatus according to an embodiment of the present disclosure.

As illustrated in FIG. 3, according to the present disclosure, an inner surface of the case CA, which forms the interior space 10, may have a shape, in which a first circle C1 and a second circle C2 are disposed to overlap each other in a partial area when the inner surface of the case CA is cut in a vertical direction, in which the first rotary shaft 21 extends. The first circle C1 may be an imaginary circle, the center of which is the first rotary shaft 21, and a diameter of which is larger than a diameter of the first gear 20. The second circle C2 may be an imaginary circle, the center of which is the second rotary shaft 31, and a diameter of which is larger than a diameter of the second gear 30.

The first partition wall 40 may include a first area 41 and a second area 42. The first partition wall 40 may be disposed in the interior space 10. The first area 41 may be disposed to be spaced apart from the first gear 20, and may be provided along a circumference of the first gear 20. The fact that the first area 41 is provided along the circumference may mean that the first area 41 is provided along a direction, in which a plurality of teeth provided in the first gear 20 are arranged. Meanwhile, the second area 42 may extend from one end 41a of the first area 41 in a direction that is away from the first rotary shaft 21. FIG. 3 illustrates a state, in which the second area 42 extends from the one end 41a of the first area 41 to a lower side.

Figure 4:
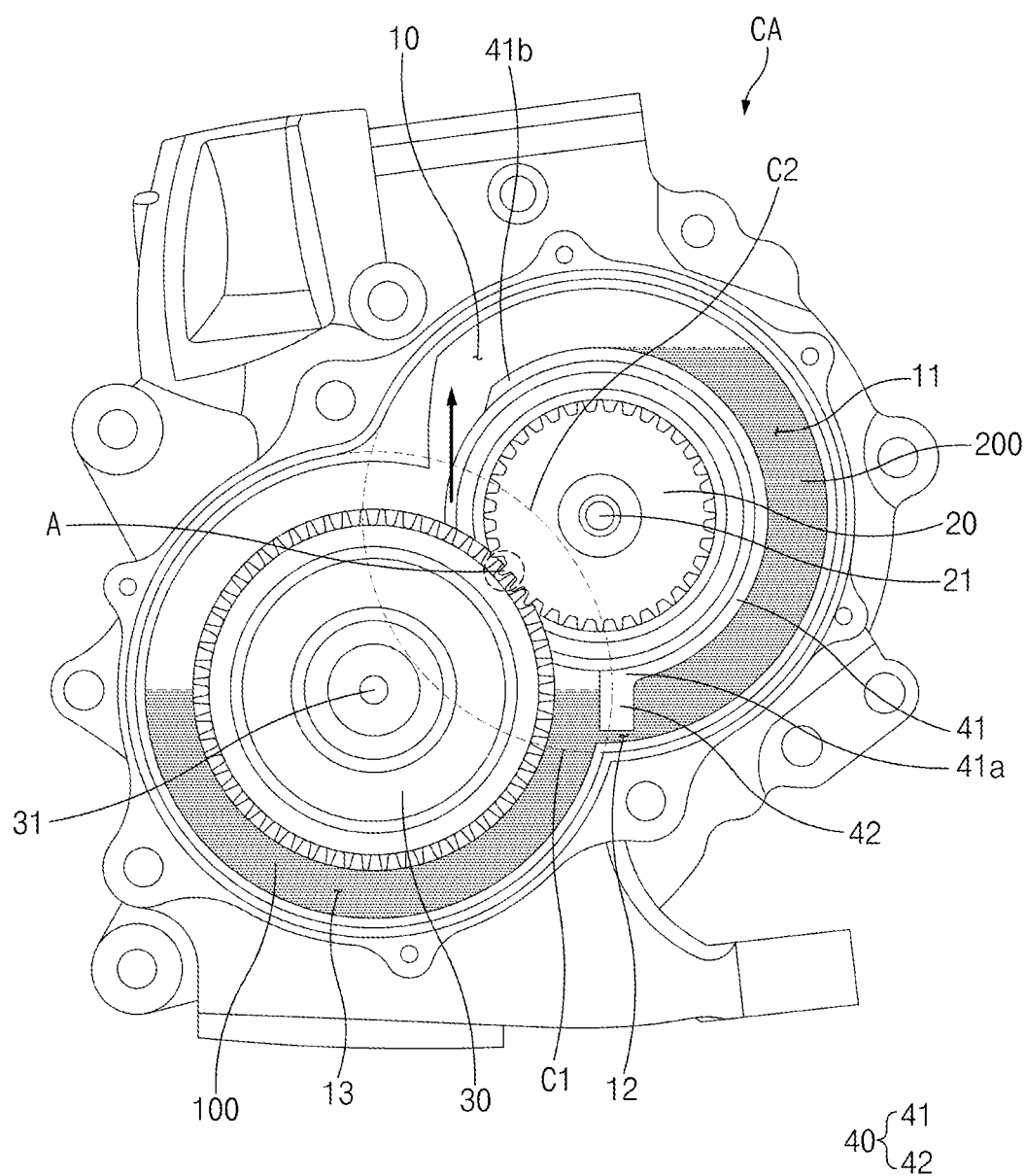
FIG. 4 is a cross-sectional view conceptually illustrating oil stored in a first inlet space and a storage space of an in-wheel driving apparatus according to an embodiment of the present disclosure.

FIG. 4 is a cross-sectional view conceptually illustrating oil stored in a first inlet space and a storage space of an in-wheel driving apparatus according to an embodiment of the present disclosure.

Meanwhile, the interior space 10 may include a first inlet space 11. FIG. 4 illustrates oil 200 stored in the first inlet space 11. The first inlet space 11 may be a space surrounded by a surface of the first partition wall 40, which is opposite to a surface of the first partition wall 40 facing the first gear 20, and the case CA. The first inlet space 11 may be a space, into which the oil churned due to rotation of the first gear 20 and the second gear 30 is introduced.

As described above, according to the in-wheel apparatus according to the related art, because the level of oil has to be restricted to a border point of a stator and a rotor, the amount of the oil is not sufficient.

However, according to the present disclosure, because oil may be additionally preserved in the first inlet space 11, into which the churned oil is introduced, the oil that may be preserved in the first inlet space 11, in addition to the oil accommodated in the in-wheel driving apparatus according to the related art, may be accommodated in the in-wheel driving apparatus, particularly, in the interior space 10 of the case CA. Accordingly, according to the present disclosure, the amount of the oil that may be accommodated in the interior of the in-wheel driving apparatus may increase.

Subsequently, referred to FIG. 4, the interior space 10 may further include a first spacing space 12 and a storage space 13. The first spacing space 12 may be a space that is formed as the second area 42 and the case CA are spaced apart from each other. The storage space 13 may be a space that is located under the second rotary shaft 31. The storage space 13 may be a space, in which the oil stays as the oil flows to a lower side of the interior space 10 due to the self-weight thereof when the first gear 20 and the second gear 30 do not rotate. FIG. 4 illustrates oil 100 stored in the storage space 13.

The oil introduced into the first inlet space 11 may be discharged to the storage space 13 via the first spacing space 12. That is, the first spacing space 12 may function as an outlet of the oil introduced into the first inlet space 11.

Meanwhile, a width of the first spacing space 12 needs to be smaller than a width of the first inlet space 11 such that an amount of the oil discharged from the first inlet space 11 is smaller than an amount of the oil introduced into the first inlet space 11. To achieve this, according to the present disclosure, an interval between the second area 42 and the case CA may be smaller than an interval between the first area 41 and the case CA. According to the present disclosure, because the width of the first spacing space 12 is smaller, the oil introduced into the first inlet space 11 may be discharged slowly through the first spacing space 12. In this case, the churned oil may be temporarily stored in the first inlet space 11.

Meanwhile, as illustrated in FIG. 4, the one end 41a of the first area 41 may be provided on a lower side of an enmeshment area "A" that is an area, in which the first gear 20 and the second gear 30 are engaged with each other. Furthermore, the opposite end 41b of the first area 41 may be provided on an upper side of the enmeshment area "A".

Furthermore, as illustrated in FIG. 4, the opposite end 41b of the first area 41 may be located on an inner side of a leftward/rightward width of the first gear 20. FIG. 3 illustrates that the opposite end 41b of the first area 41 is located on the inner side of the leftward/rightward width of the first gear 20 and is provided in a left area of the first gear 20. When the opposite end 41b of the first area 41 is located on the inner side of the leftward/rightward width of the first gear 20, the oil churned upwards by the first and second gears 20 and 30 may be smoothly introduced into the first inlet space 11 while not colliding with the first area 41.

Figure 5:
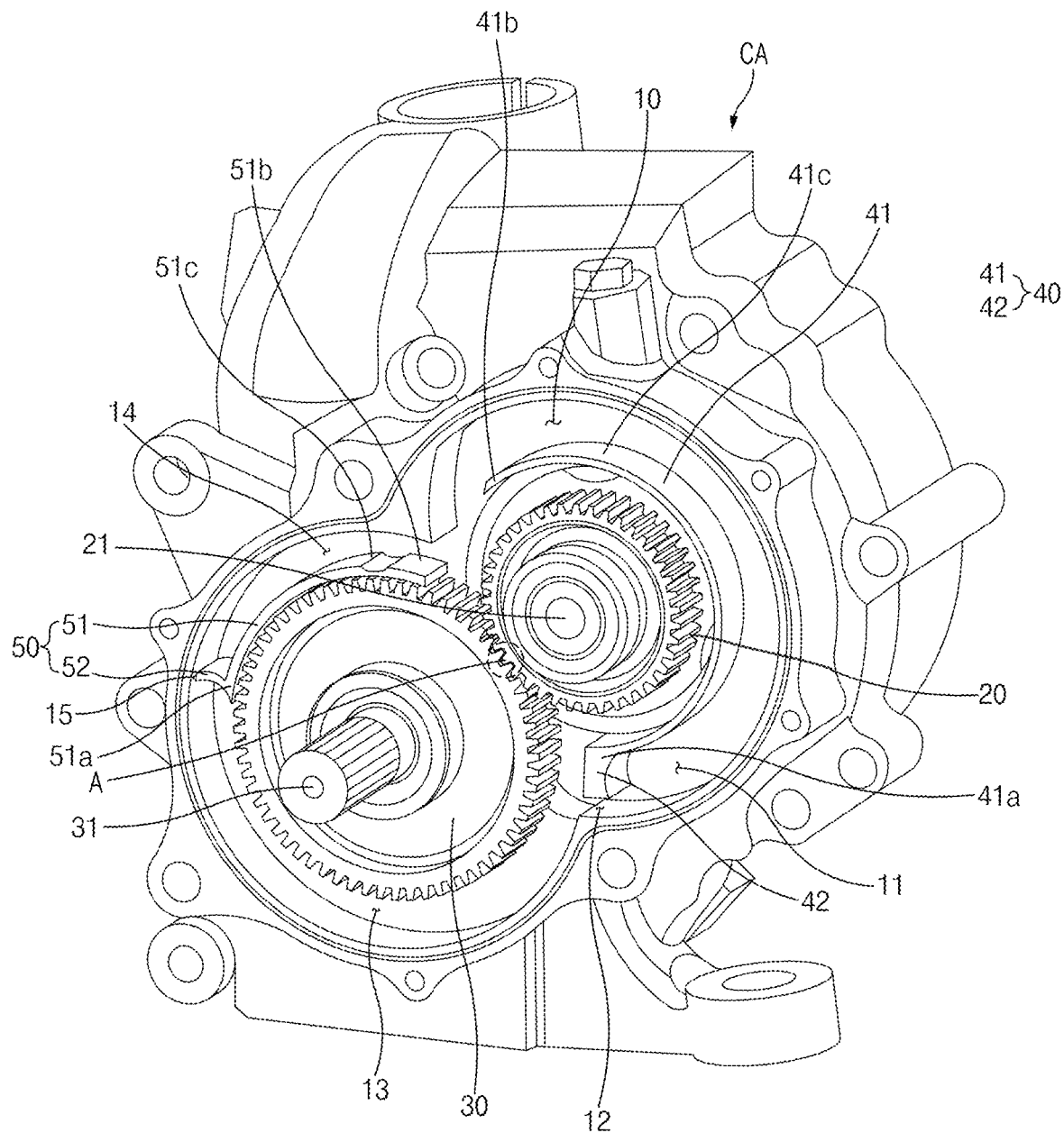
FIG. 5 is a perspective view illustrating that an in-wheel driving apparatus according to another embodiment of the present disclosure includes a second partition wall.
Figure 6:
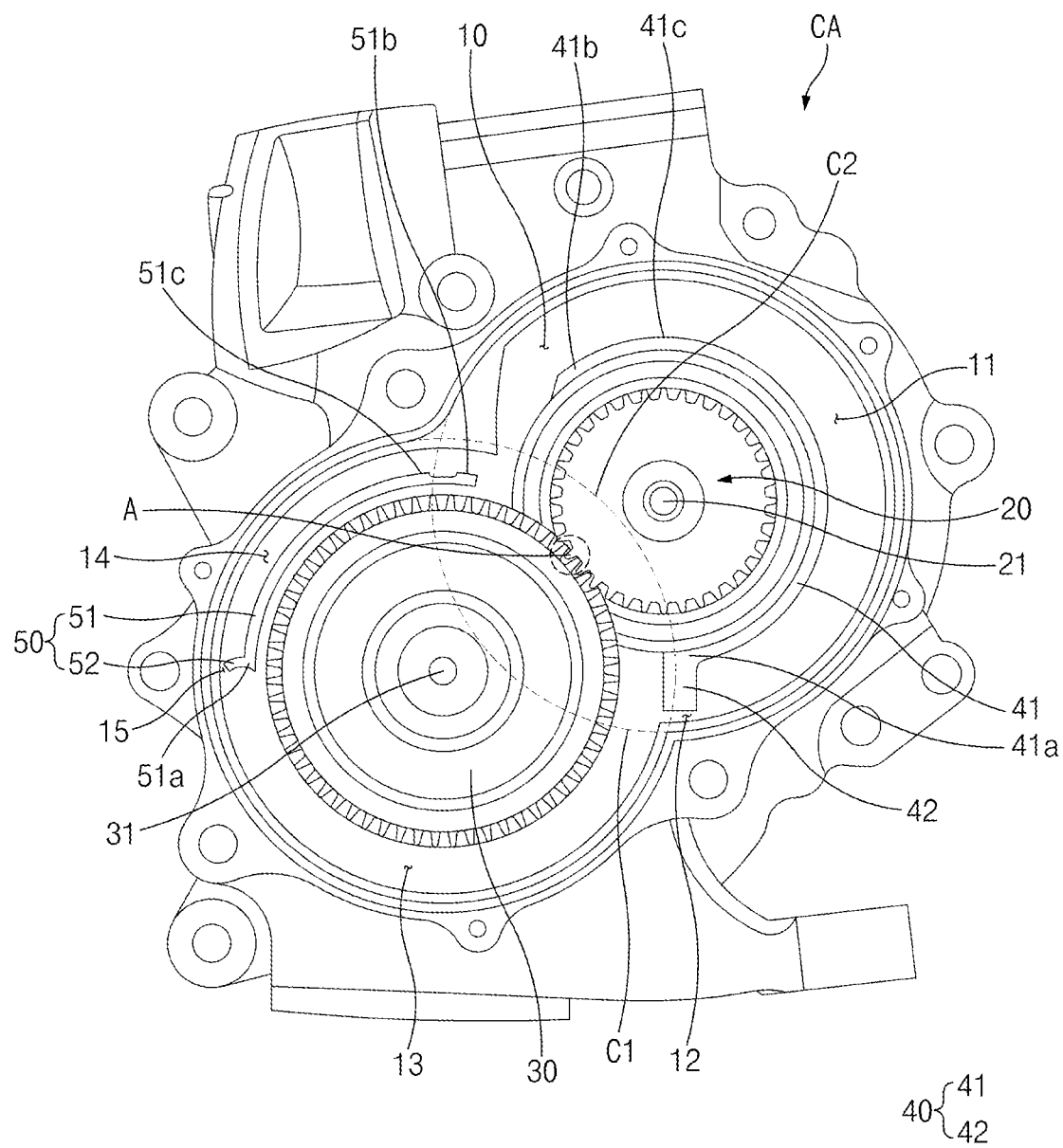
FIG. 6 is a cross-sectional view illustrating that an in-wheel driving apparatus according to another embodiment of the present disclosure includes a second partition wall.

FIG. 5 is a perspective view illustrating that an in-wheel driving apparatus according to another embodiment of the present disclosure includes a second partition wall. FIG. 6 is a cross-sectional view illustrating that an in-wheel driving apparatus according to another embodiment of the present disclosure includes a second partition wall. Hereinafter, aspects of an in-wheel driving apparatus according to a second embodiment of the present disclosure which are different from those of the in-wheel driving apparatus according to the embodiment of the present disclosure will be mainly described.

The in-wheel driving apparatus according to the second embodiment of the present disclosure may further include a second partition wall 50. Similarly to the first partition wall 40, the second partition wall 50 also may be disposed in the interior space 10.

Figure 7:
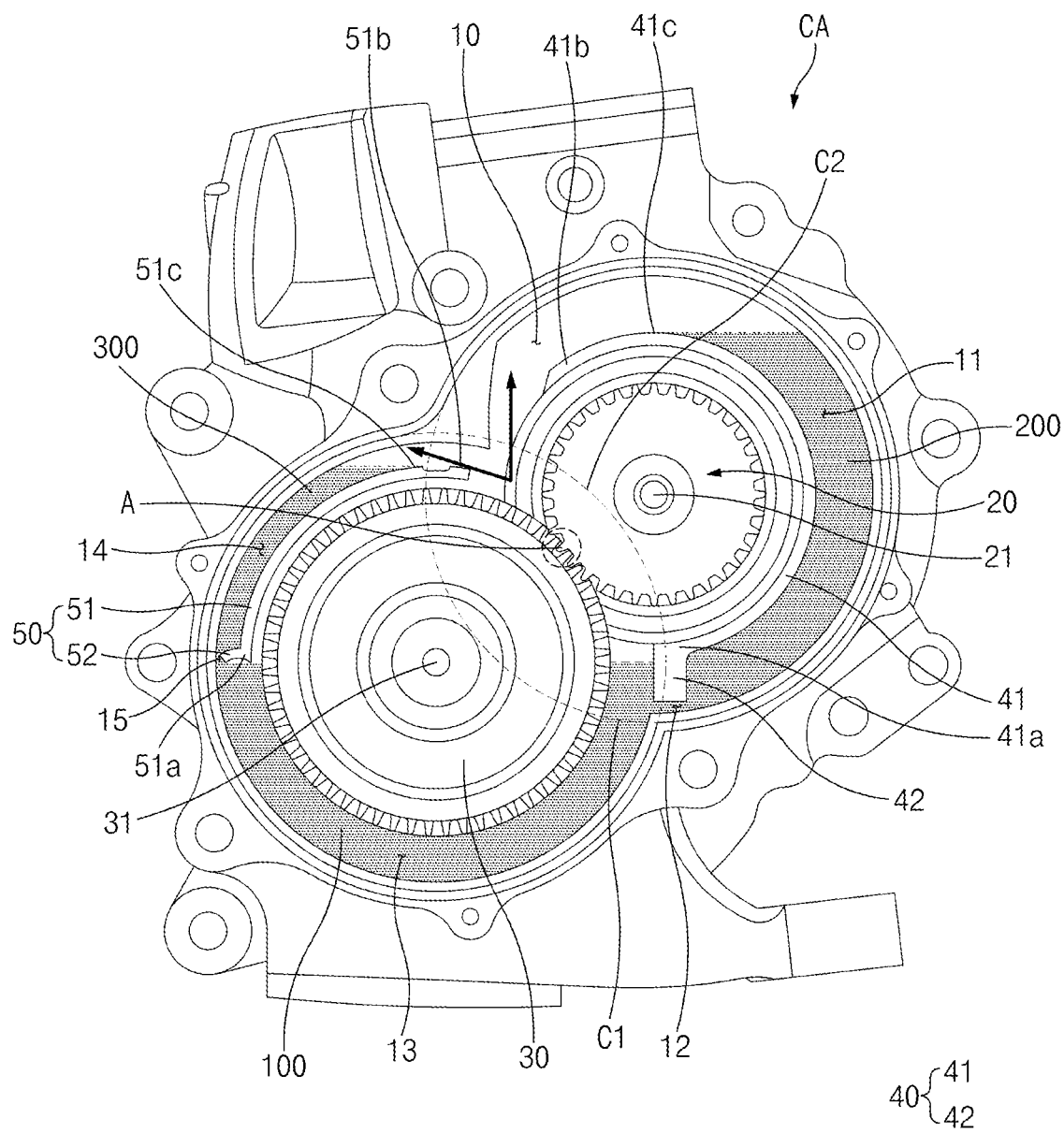
FIG. 7 is a cross-sectional view conceptually illustrating oil stored in a first inlet space, a second inlet space, and a storage space of an in-wheel driving apparatus according to another embodiment of the present disclosure.

Then, the second partition wall 50 may include a third area 51 and a fourth area 52. The third area 51 may be disposed to be spaced apart from the second gear 30, and may be provided along a circumference of the second gear 30. The fourth area 52 may extend from one end 51a of the third area 51 in a direction that is away from the second rotary shaft 31. FIG. 6 illustrates a state, in which the fourth area 52 extends from the one end 51a of the third area 51 horizontally to the left side. Furthermore, the fourth area 52 may be located on a lower side of the second area 42, but unlike this, the fourth area 52 may be located on an upper side of the second area 42 and may be located at the same vertical height as that of the second area 42. FIG. 7 is a cross-sectional view conceptually illustrating oil stored in a first inlet space, a second inlet space, and a storage space of an in-wheel driving apparatus according to another embodiment of the present disclosure.

The interior space 10 may include a second inlet space 14. FIG. 7 additionally illustrates oil 300 stored in the second inlet space. The second inlet space 14 may be a space surrounded by a surface of the second partition wall 50, which is opposite to a surface of the second partition wall 50 facing the second gear 30, and the case CA. Similarly to the first inlet space 11, the second inlet space 14 may be a space, into which the oil churned due to rotation of the first gear 20 and the second gear 30 is introduced.

According to the second embodiment of the present disclosure, because the oil churned by the first gear 20 and the second gear 30 may be preserved also in the second inlet space 14 as well as in the first inlet space 11, a larger amount of the oil may be accommodated in the in-wheel driving apparatus than in the embodiment of the present disclosure. Accordingly, the amount of the oil that may be accommodated in the interior of the in-wheel driving apparatus may further increase.

Meanwhile, according to the second embodiment of the present disclosure, the interior space 10 may further include a second spacing space 15. The second spacing space 15 may be a space that is formed as the fourth area 52 and the case CA are spaced apart from each other. The oil introduced into the second inlet space 14 may be discharged to the storage space 13 via the second spacing space 15. That is, the second spacing space 15 may function as an outlet of the oil introduced into the second inlet space 14.

Meanwhile, a width of the second spacing space 15 needs to be smaller than a width of the second inlet space 14 such that an amount of the oil discharged from the second inlet space 14 is smaller than an amount of the oil introduced into the second inlet space 14. To achieve this, according to the second embodiment of the present disclosure, an interval between the fourth area 52 and the case CA may be smaller than an interval between the third area 51 and the case CA. According to the second embodiment of the present disclosure, because the width of the second spacing space 15 is smaller, the oil introduced into the second inlet space 14 may be discharged slowly through the second spacing space 15. In this case, the churned oil may be temporarily stored in the second inlet space 14.

Meanwhile, referring to FIGS. 5 to 7, in the in-wheel driving apparatus according to the second embodiment of the present disclosure, an uppermost end of the first partition wall 40 may be disposed on an upper side of an uppermost end of the second partition wall 50. That is, as described above, the first rotary shaft 21 may be disposed on an upper side of the second rotary shaft 31 and the first gear 20 may be disposed on an upper side of the second gear 30, and accordingly, an uppermost end 41c of the first area 41 also may be disposed on an upper side of an uppermost end 51c of the third area 51.

Furthermore, according to the second embodiment of the present disclosure, the one end 51a of the third area 51 may be configured to face the enmeshment area "A" while the second gear 30 being interposed between the one end 51a of the third area 51 and the enmeshment area "A". Furthermore, the opposite end 51b of the third area 51 may be provided on an upper side of the enmeshment area "A". The opposite end 51b of the third area 51 may be provided on an inner side of the leftward/rightward width of the second gear 30. The above-described contents are referred for the meaning of the inner side of the leftward/rightward width.

Hereinafter, an aspect of the oil flowing according to an operation of the in-wheel driving apparatus according to the embodiment or the second embodiment of the present disclosure will be described with reference to FIGS. 4 and 7.

When the motor is not operated, neither the second gear 30 nor the first gear 20 rotates, and thus the oil is preserved in the storage space 13. However, when the motor is operated, the second gear 30 and the first gear 20 engaged with the second gear 30 rotate, and accordingly, the oil is churned.

In more detail, as illustrated in FIGS. 4 and 7, the oil is churned in a direction of an arrow, and the churned oil is introduced into at least any one of the first inlet space 11 or the second inlet space 14. Then, because a width of the first spacing space 12 is smaller than a width of the inlet of the first inlet space 11 and a width of the second spacing space 15 is smaller than a width of the inlet of the second inlet space 14, the oil is gradually accumulated and stored in the first inlet space 11 or the second inlet space 14. Further, then, the height of the oil stored in the storage space 13 gradually decreases.

Thereafter, the rotation of the gear is stopped when the operation of the motor is stopped, and the oil accumulated in the first inlet space 11 and the second inlet space 14 is introduced into the storage space again through the first spacing space 12 and the second spacing space 15.

According to the present disclosure, because the oil may be preserved in the space, into which the churned oil is introduced, through the partition walls that surround the gear, the amount of the oil that may be accommodated in the interior thereof may increase.

The above description is a simple exemplification of the technical spirits of the present disclosure, and the present disclosure may be variously corrected and modified by those skilled in the art to which the present disclosure pertains without departing from the essential features of the present disclosure. Accordingly, the embodiments disclosed in the present disclosure is not provided to limit the technical spirits of the present disclosure but provided to describe the present disclosure, and the scope of the technical spirits of the present disclosure is not limited by the embodiments. Accordingly, the technical scope of the present disclosure should be construed by the attached claims, and all the technical spirits within the equivalent ranges fall within the scope of the present disclosure.

What is claimed is:

1. An in-wheel driving apparatus comprising:
a case having an interior space;
a first gear disposed in the interior space and rotatable about a first rotary shaft;
a second gear engaged with the first gear, disposed in the interior space, and rotatable about a second rotary shaft;
a first partition wall disposed in the interior space, the first partition wall including:
a first area extending along a circumference of the first gear, the first area having:
one end located on a lower side of an enmeshment area that is an area in which the first gear and the second gear are engaged with each other, and
an opposite end located on an upper side of the enmeshment area, and
a second area extending from the one end of the first area, the second area extends in a direction away from the first rotary shaft, and the second area is spaced apart from the case; and
a second partition wall disposed in the interior space, the second partition wall including a third area extending along a circumference of the second gear,
wherein an uppermost end of the first area of the first partition wall is disposed above an upper side of an uppermost end of the third area of the second partition wall.

2. The in-wheel driving apparatus of claim 1, wherein the interior space includes:
a first inlet space surrounded by a first surface of the first partition wall, which is opposite to a second surface of the first partition wall facing the first gear, and the case, and including a space, into which oil churned due to rotation of the first gear and the second gear is introduced.

3. The in-wheel driving apparatus of claim 2, wherein the interior space further includes:
a first spacing space by which the second area and the case are spaced apart from each other; and
a storage space located under the second rotary shaft, and wherein the oil introduced into the first inlet space is discharged to the storage space via the first spacing space.

4. The in-wheel driving apparatus of claim 1, wherein the first rotary shaft is disposed on an upper side of the second rotary shaft.

5. The in-wheel driving apparatus of claim 1, wherein the opposite end of the first area is located on a position overlapping a leftward/rightward width of the first gear.

6. The in-wheel driving apparatus of claim 1, wherein an interval between the second area and the case is smaller than an interval between the first area and the case.

7. The in-wheel driving apparatus of claim 1, wherein the second partition wall further includes
a fourth area extending from one end of the third area in a direction away from the second rotary shaft.

8. The in-wheel driving apparatus of claim 7, wherein the interior space includes:
a second inlet space surrounded by a first surface of the second partition wall, which is opposite to a second surface of the second partition wall facing the second gear, and the case, and including a space, into which oil churned due to rotation of the first gear and the second gear is introduced.

9. The in-wheel driving apparatus of claim 8, wherein the interior space further includes:
a second spacing space by which the fourth area and the case are spaced apart from each other; and
a storage space located under the second rotary shaft, wherein the oil introduced into the second inlet space is discharged to the storage space via the second spacing space.

10. The in-wheel driving apparatus of claim 7, wherein the one end of the third area is located on a position such that the second gear is disposed between the one end of the third area and the enmeshment area, and
an opposite end of the third area is located on an upper side of the enmeshment area.

11. The in-wheel driving apparatus of claim 7, wherein an opposite end of the third area, which is located on an opposite side to the one end of the third area, is located on a position overlapping a leftward/rightward width of the second gear.

12. The in-wheel driving apparatus of claim 7, wherein the second area is located on a lower side of the fourth area.

* * * * *